United States Patent [19]
Jaenker

[11] Patent Number: 5,553,828
[45] Date of Patent: Sep. 10, 1996

[54] ELECTRO-HYDRAULIC ACTUATOR

[75] Inventor: Peter Jaenker, Garching, Germany

[73] Assignee: Deutsche Aerospace AG, Germany

[21] Appl. No.: 318,164

[22] Filed: Oct. 5, 1994

[30] Foreign Application Priority Data

Oct. 5, 1993 [DE] Germany ............. 43 33 871.2

[51] Int. Cl.$^6$ ................................. F16K 31/02
[52] U.S. Cl. ................ 251/129.01; 251/129.06
[58] Field of Search ................ 137/807, 827, 137/909; 251/129.06, 129.01; 60/530

[56] References Cited

U.S. PATENT DOCUMENTS

| | | | |
|---|---|---|---|
| 4,043,532 | 8/1977 | Draxler | 251/11 |
| 4,114,645 | 9/1978 | Pauliukonis | 251/11 |
| 5,222,713 | 6/1993 | Lawless et al. | 251/129.06 |
| 5,238,223 | 8/1993 | Mettner et al. | 251/129.06 |
| 5,419,133 | 5/1995 | Schneider | 251/11 |

FOREIGN PATENT DOCUMENTS 4127860  2/1993  Germany .

*Primary Examiner*—Stephen M. Hepperle
*Attorney, Agent, or Firm*—Evenson, McKeown, Edwards & Lenahan P.L.L.C.

[57] ABSTRACT

The invention relates to an electro-hydraulic actuator, especially for an antilock brake system, which directly converts electrical input energy into hydraulic useful energy and has an especially simple and problem-free design as well as very rapid adjustability. A working chamber of the actuator according to the invention is filled with an electrostrictive fluid and provided with an electrically controlled electrode system to generate an electrical field that causes a change in pressure and/or volume in the electrostrictive fluid.

20 Claims, 2 Drawing Sheets

ELECTRO-HYDRAULIC ACTUATOR

BACKGROUND AND SUMMARY OF THE INVENTION

The invention relates to an electro-hydraulic actuator for brake system or the like, of the type having a fluid filled working chamber.

Numerous types of known electro-hydraulic actuators for converting electrical energy into hydromechanical energy are used, for example as the master or wheel brake cylinders of vehicle braking systems, for periodic pressure relief in antilock brake systems, as electrically powered liquid pumps, or in the form of electro-hydraulic positioning drives. A common feature of these actuators is that the electrical input energy is initially converted into purely mechanical working energy, which is then converted into a corresponding change in pressure or volume in the fluid-filled working chamber of the actuator. As a result, such actuators usually exhibit undesirably high power losses and corresponding low efficiency, are limited to low-frequency regulating speeds, and/or require relatively costly wear-prone design.

German patent document DE-OS 41 27 860 discloses a pump system for conveying liquid or gaseous media, in which a piezoelectric coated film is located in a working chamber that is filled with a constant hydraulic volume and is separated from the feed chamber of the pump by a diaphragm. The film is periodically charged with an electrical voltage to produce a periodic increase in the volume of the working chamber as a result of a change in thickness of the piezoelectric film, thereby transporting liquid or gas by a pulsating movement. A pump system of this kind is superior to a conventional design in many respects, but has the disadvantage that the changes in volume that can be achieved, based on the total volume of the working chamber, are extremely small, first because a piezoelectric, when undergoing an increase in length, also undergoes a transverse contraction in the opposite direction under the influence of an electrical voltage, and therefore naturally has a very low volumetric expansion coefficient; and second because the working chamber can be filled only partially with the piezoelectric film while the remainder of the working chamber volume is required for the hydraulic filling that does not participate in the electrically induced volume change.

The goal of the present invention is to provide an electro-hydraulic actuator of the species recited at the outset which has low-inertia, high-frequency adjustability and a very simple, low-wear, space-saving design.

This goal is achieved by the electro-hydraulic actuator according to the invention in which the working chamber of the actuator contains an electrostrictive fluid, and an electrically controlled electrode arrangement is provided to generate an electric field which acts on the fluid. By way of the positive or negative expansion behavior of the electrostrictive fluid, input electrical energy is thus converted directly, without interposition of any kind of mechanically moved components, into output energy of the actuator that can be used to change the volume and/or pressure. Therefore, in comparison to the piezoelectric pump system described at the outset, significantly higher changes in volume based on the total volume of the working chamber can be achieved, first because the working chamber is filled completely with the electrostrictive medium, and second because electrostrictive fluids do not exhibit a transverse contraction, and can achieve a much higher volumetric expansion coefficient than piezoelectrics. The actuator according to the invention has an extremely simple, problem-free, low-loss, yet space-saving design and has the ability to be regulated very quickly, allowing working frequencies of more than 1 kHz.

The effective pressure level or working volume of the actuator according to the invention can be regulated solely by the voltage potential applied to the electrode system, to any value within fixed limits, so that for this purpose the volume of fluid contained in the working chamber does not have to be changed. Thus, in another structurally advantageous embodiment of the invention, the working chamber has a completely enclosed design and is filled with a constant amount of electrostrictive fluid.

The changes in volume of the actuator produced by the electrostriction effects are advantageously transmitted to the exterior by a movable limiting wall of the working chamber, which preferably consists of a flexible diaphragm. For use of the actuator as a positioning drive or for valve actuation, the movable limiting wall of the working chamber is coupled with the positioning element of the positioning drive. The positioning path of the positioning element is therefore adjustable depending on the voltage level applied to the electrode system.

Optionally or additionally, the pressure and/or volume changes in the electrostrictive fluid are also transmitted in a structurally simple fashion, to a fluid (preferably hydraulic) system separated from the working chamber. A hydraulic chamber abutting the working chamber of the actuator is selectively pressurized and relieved of pressure by the electrostriction effect produced in the working chamber by means of a movable partition. The hydraulic chamber separated from the electrostrictive fluid is preferably the delivery chamber of a liquid pump.

According to another especially advantageous embodiment of the invention, the actuator is used for selective pressure regulation of a hydraulic brake system for lowering brake pressure in the event of a threatened lockup of the vehicle wheels in an antilock braking system.

The electrode system in the working chamber is advantageously made from a plurality of individual electrodes, running parallel to one another and connected to have alternately positive and negative polarity, in order to use a relatively low operating voltage to generate a sufficiently strong electrical field that traverses the working chamber essentially uniformly.

Other objects, advantages and novel features of the present invention will become apparent from the following detailed description of the invention when considered in conjunction with the accompanying drawings.

BRIEF DESCRIPTION OF THE DRAWINGS

FIG. 2b is a section along line II—II and FIG. 2a; and

DETAILED DESCRIPTION OF THE DRAWINGS

Figure 1:
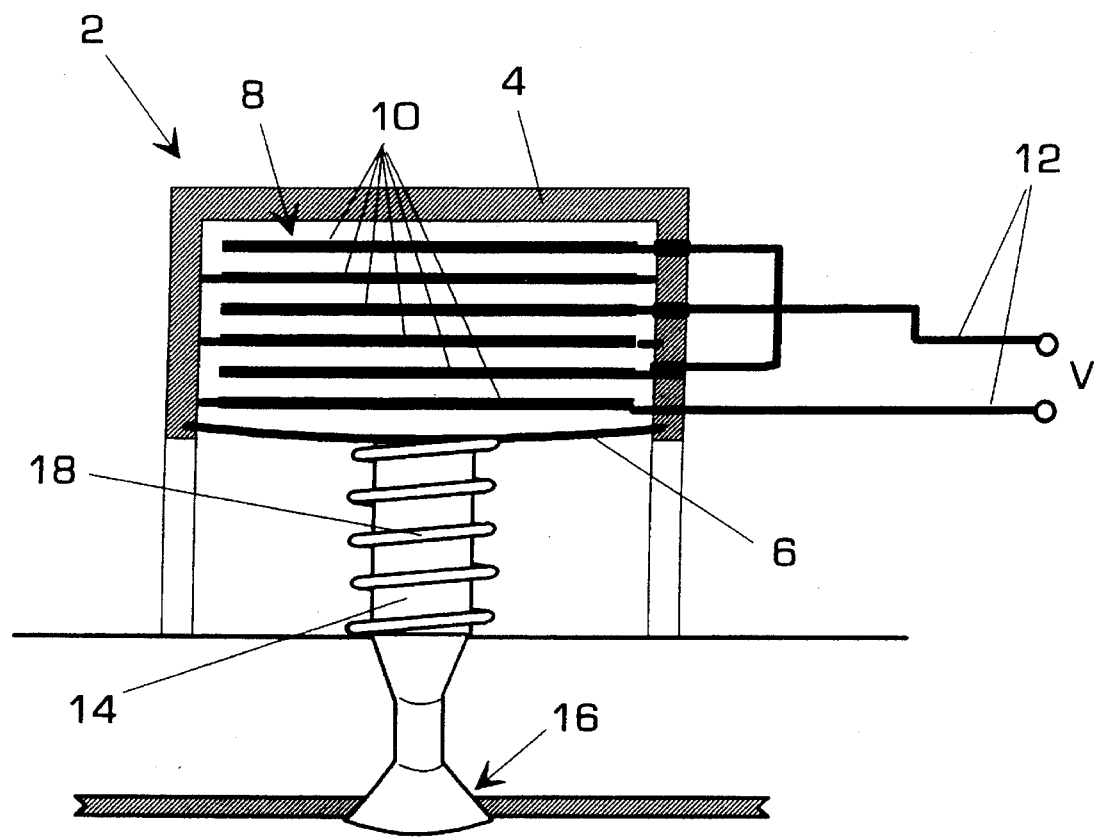
FIG. 1 is a section through an electrostrictive actuator for actuating a control valve according to the invention.

Referring to FIG. 1, the reactor 2 comprises a working chamber 4 in an encapsulated design, which is sealed off by a movable limiting wall in the form of a flexible diaphragm 6, and filled with an electrostrictive fluid. The working chamber contains a system of electrodes 8 consisting of a plurality of plate electrodes 10 uniformly spaced apart from one another for generating an electrical field that traverses the liquid filling essentially uniformly. Plate electrodes 10 are alternately connected with connecting leads 12 of an external voltage source (not shown). A positioning element 14 is fastened to diaphragm 6 and is provided for actuating a control valve 16, and is held by a compression spring 18 in the valve-closed position.

If an external voltage V is applied to electrode system 8, the electrostrictive liquid filling expands and its volume increases under the influence of the applied electrical field, so that positioning element 14 moves downward and control valve 16 is opened. Since the volume expansion is a function of the electrical field strength, control valve 16 can be controlled very accurately by a suitable choice of input voltage V to any desired intermediate position.

As a representative electrostrictive fluid that undergoes a volume expansion or pressure increase under the influence of an electrical field (type I), 1-pentanol in n-heptane (with a molar component of 33%) is suitable for example. This mixture changes its volume by approximately 1 part per thousand when an electrical field of 4 MV/m is applied. It is known that there are also electrostrictive fluids with negative expansion behavior (type II), such as for example, nitrobenzene. By using this second type of fluid, actuator 2 can be designed so that control valve 16 is completely open in the zero-voltage state of electrode system 8 and closes further and further with increasing input voltage V.

Figure 2A:
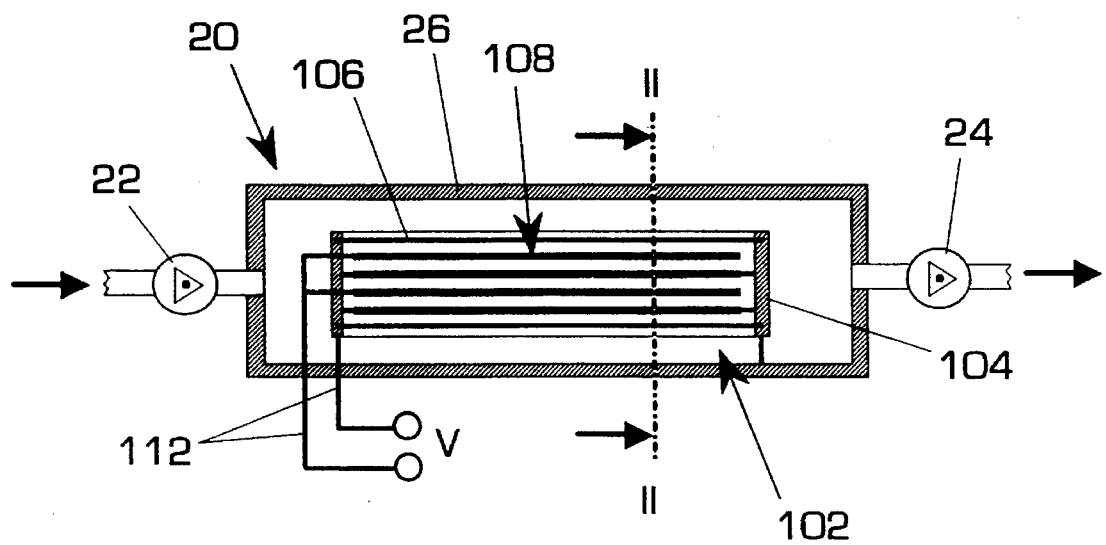
FIG. 2a is a lengthwise section of an electrostrictive actuator according to the invention in conjunction with a pump system.
Figure 2B:
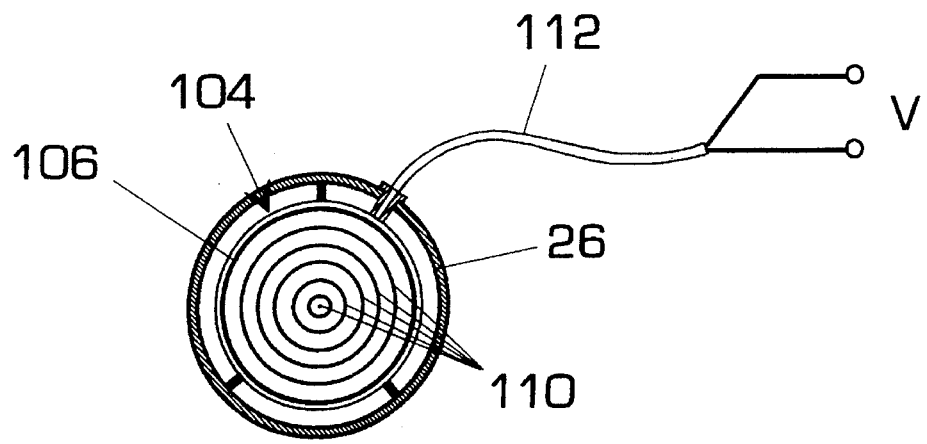

The actuator 102 shown in FIGS. 2a and 2b, whose components corresponding to the first embodiment have been reference numerals that have been increased by 100, is located in the delivery chamber 2b of a hydraulic pump 20 having an intake valve and an exhaust valve 22 and 24, respectively. Actuator 102 in this case consists of a cylindrical working chamber 104, again in an encapsulated design, which is provided at least in the area of the cylinder jacket with a flexible boundary wall in the form of a diaphragm 106. Working chamber 104 is filled with an electrostrictive fluid in which an electrode system 108 is located, which in this case consists of ring electrodes 110 (FIG. 2b) that are concentric with one another, and distributed uniformly over the cross section of the working chamber. The electrodes in turn are charged alternately with positive and negative voltage polarity through connecting leads 112 with an external control voltage V.

The electrostrictive fluid filling is preferably of type I, but type II fluids can be used as well. By applying a pulsating control voltage V, diaphragm 106 is set moving cyclically. Because of the very rapid response of the actuator (the electrostriction process takes place in less than 1 ms), high pulsation frequencies on the order of 1 kHz can be reached. In view of the compressibility of the electrostrictive fluid, the differential pressure that can be achieved (and disregarding the compressibility of the delivery fluid, consequently the maximum delivery pressure as well) is approximately 40 bars.

Figure 3:
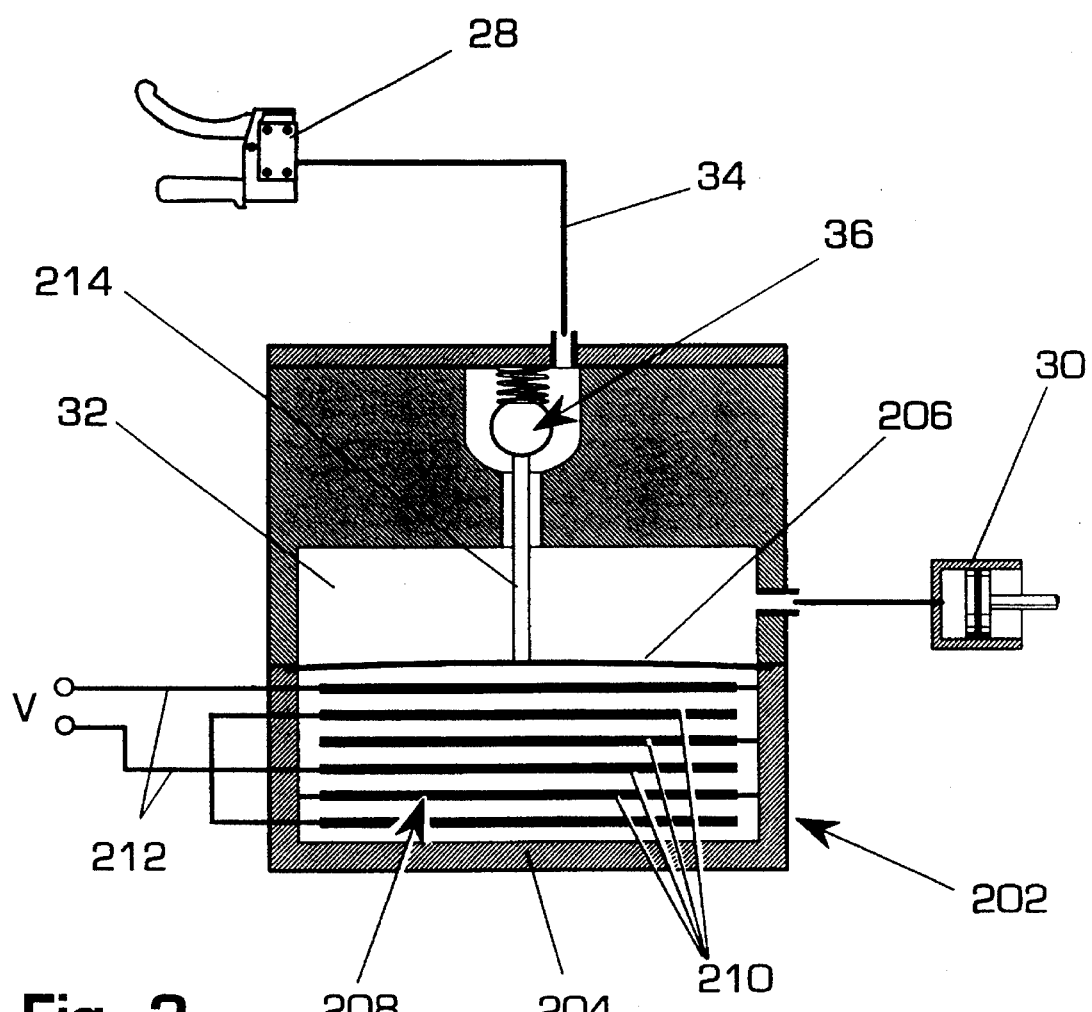
FIG. 3 is a section of an electrostrictive actuator according to the invention in conjunction with an antilock braking system.

In FIG. 3, those components that correspond to the first embodiment have reference numerals that are higher by 200. Actuator 202 is shown in conjunction with an antilock braking system in the circuit of a hydraulic vehicle braking system, between whose master cylinder 28 and wheel brake cylinder 30 a hydraulic pressure relief chamber 32 is located that is provided on the side of pressure supply line 34 coming from master cylinder 28 with a shutoff valve 36 biased in the closed position by a spring. Adjacent to pressure relief chamber 32 and separated from the latter by diaphragm 206 is working chamber 204 of actuator 202 which again is completely filled with an electrostrictive fluid and provided with an electrode packet 208 composed of plate electrodes 210.

FIG. 3 shows working chamber 204 in the state of maximum volume increase. Shutoff valve 36 is held in the open position by diaphragm 205 with the aid of positioning element 214, so that the fluid pressure generated in master cylinder 28 acts without reduction on wheel brake cylinder 30 through pressure relief chamber 32, whose volume in this state is reduced to the minimum value.

As soon as the antilock brake system responds however, control voltage V (through a regulating circuit, not shown) is changed so that the electrostrictive fluid in working chamber 204 undergoes a volume contraction. As a result, shutoff valve 36 is released from diaphragm 206 and moves into the closed position; in other words pressure relief chamber 32 and wheel brake cylinder 28 are shut off from the master cylinder pressure and at the same time, because of the volume contraction of working chamber 204, the hydraulic pressure in pressure relief chamber 32 and hence in wheel brake cylinder 30 as well is reduced. By suitable control of input voltage V, very precise and rapid brake pressure regulation at wheel brake cylinder 30 can be achieved.

The electrostrictive fluid in this case is preferably type II, and therefore has a negative expansion behavior under the influence of an electrical field, so that the brake pressure system remains functional in the event of a voltage failure, even without antilock regulation.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Electro-hydraulic actuator device comprising:

a working chamber;

an electrostrictive fluid contained in said working chamber;

an electric field generator arranged in communication with said electrostrictive fluid;

means for controlling an electric field generated by said electric field generator to provide a variable electric field acting on said electrostrictive fluid; and actuator output means for generating a displacement in direct response to volumetric expansion of said electrostrictive fluid in said working chamber.

2. Electro-hydraulic actuator device according to claim 1, wherein said electric field generator comprises a plurality of electrodes.

3. Electro-hydraulic actuator device according to claim 2, wherein said electric field generator comprises a plurality of plate electrodes arranged in substantially parallel spaced proximity within said working chamber and means for applying a control voltage to said electrodes, whereby a substantially uniform electric field is generated within said electrostrictive fluid in response to magnitude of said control voltage.

4. Electro-hydraulic actuator device according to claim 1, wherein said working chamber is enclosed on all sides thereof and contains a fixed quantity of said electrostrictive fluid.

5. Electro-hydraulic actuator device according to claim 3, wherein said working chamber is enclosed on all sides thereof and contains a fixed quantity of said electrostrictive fluid.

6. Electro-hydraulic actuator device according to claim 4, wherein at least one surface of said working chamber is enclosed by a displaceable wall which is actuated by expansion or contraction of said electrostrictive fluid in response to changes in said electric field.

7. Electro-hydraulic actuator device according to claim 5, wherein at least one surface of said working chamber is enclosed by a displaceable wall which is actuated by expansion or contraction of said electrostrictive fluid in response to changes in said electric field.

8. Electro-hydraulic actuator device according to claim 6, wherein said displaceable wall comprises a flexible diaphragm.

9. Electro-hydraulic actuator device according to claim 7, wherein said displaceable wall comprises a flexible diaphragm.

10. Electro-hydraulic actuator device according to claim 8, further comprising a positioning element which is mechanically coupled to said diaphragm for displacement thereby.

11. Electro-hydraulic actuator device according to claim 9, further comprising a positioning element which is mechanically coupled to said diaphragm for displacement thereby.

12. Electro-hydraulic actuator device according to claim 10, wherein said positioning element is a valve actuating element.

13. Electro-hydraulic actuator device according to claim 11, wherein said positioning element is a valve actuating element.

14. Electro-hydraulic actuator device according to claim 6, further comprising an additional chamber which is separated from said working chamber by said displaceable wall, whereby movement of said displaceable wall selectively pressurizes or relieves pressure in said additional chamber.

15. Electro-hydraulic actuator device according to claim 7, further comprising an additional chamber which is separated from said working chamber by said displaceable wall, whereby movement of said displaceable wall selectively pressurizes or relieves pressure in said additional chamber.

16. Electro-hydraulic actuator device according to claim 14, wherein said additional chamber comprises a delivery chamber of a pump device.

17. Electro-hydraulic actuator device according to claim 1, wherein said working chamber is hydraulically coupled to a pressure line of a hydraulic brake system.

18. Electro-hydraulic actuator device according to claim 14, wherein one of said working chamber and said additional chamber is hydraulically coupled to a pressure line of a hydraulic brake system.

19. Electro-hydraulic actuator device according to claim 17, wherein said hydraulic brake system is an antilock brake system.

20. Electro-hydraulic actuator device according to claim 18, wherein said hydraulic brake system is an antilock brake system.

* * * * *